June 23, 1942.  E. R. PERRY  2,287,706
BICYCLE BOAT
Filed Sept. 2, 1941

INVENTOR.
Elwood R. Perry
BY Chapin A. Ferguson
ATTORNEY

Patented June 23, 1942

2,287,706

UNITED STATES PATENT OFFICE 2,287,706

BICYCLE BOAT

Elwood R. Perry, Charlottesville, Va.

Application September 2, 1941, Serial No. 409,295

1 Claim. (Cl. 115—26)

This invention relates to improvements in bicycle boats and has for its object to provide a simple and efficient means of travel on water.

The invention consists of the novel construction and arrangement of the parts and combination of parts set forth in the following specification and pointed out in detail in the appended claim.

Figure 1:
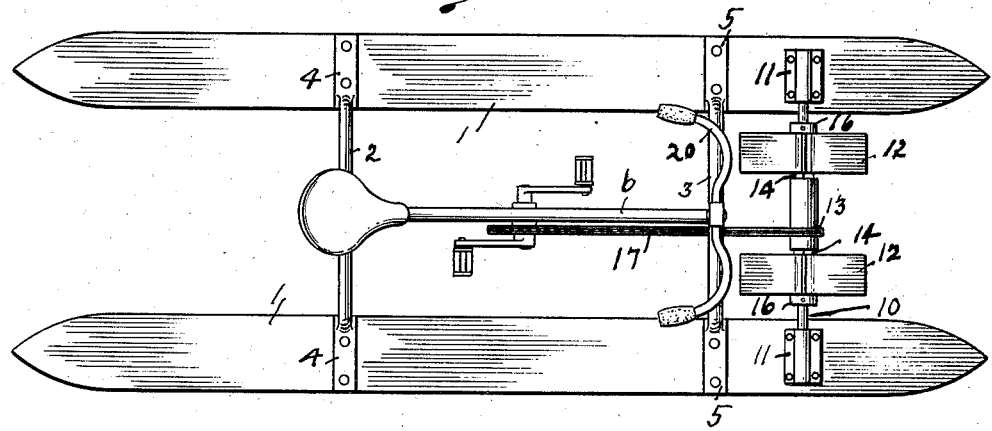
Figure 1 is a plan view of my invention.
Figure 2:
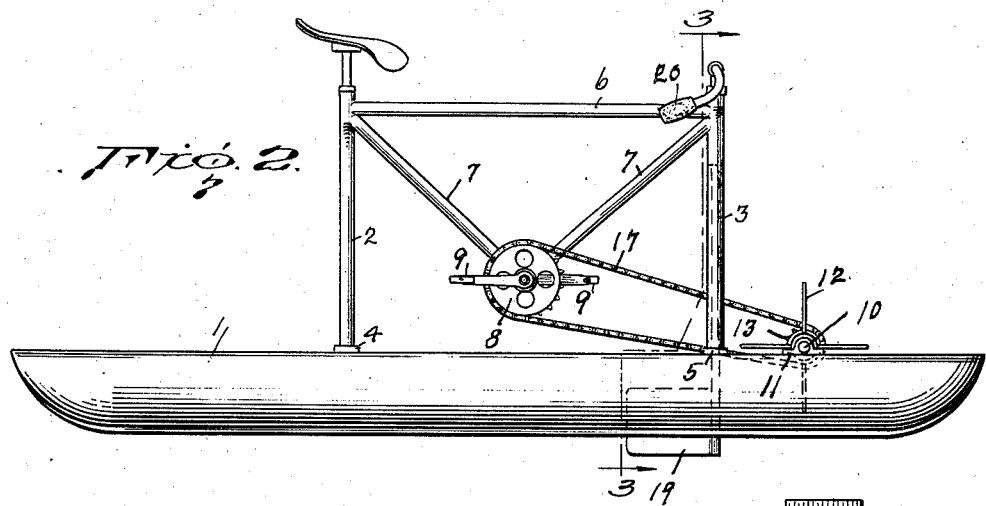
Figure 2 is a side elevation of Figure 1.
Figure 3:
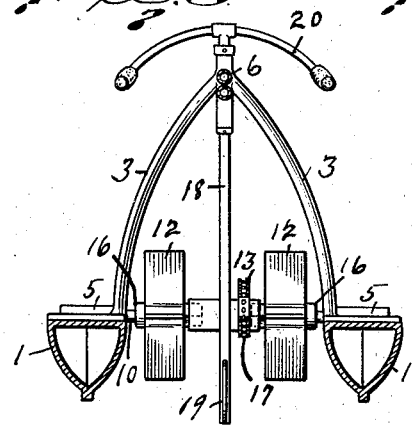
Figure 3 is a section on the line 3—3 of Figure 2.
Figure 4:
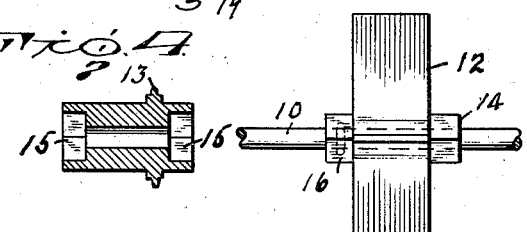
Figure 4 is a vertical longitudinal section of the sprocket wheel and hub.
Figure 5:
Figure 5 is an end view of the sprocket wheel and hub.
Figure 6:
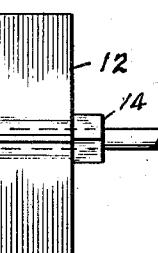
Figure 6 is an elevation of one of the paddle wheels mounted on the shaft, the latter being broken away.

Referring to the accompanying drawing forming part of this specification, and in which like reference numerals designate like parts throughout the several views thereof, 1 designates the floats which are hollow and rest on the water. These floats 1 are connected by the uprights 2 and 3 which hold the floats in their relative position, and are connected to the floats at 4 and 5. These uprights 2 and 3 are connected at their uuper ends by a rod 6 and two downwardly converging rods 7, in the lower ends of which latter is mounted a sprocket wheel 8 operated by the pedals 9. Extending across between the floats 1, near the front end thereof, is a shaft 10 secured thereto in the plates 11. Revolubly mounted on the said shaft 10 are two sets of paddle wheels 12 and a sprocket wheel 13. The paddle wheels 12 each have a square boss 14 on the side adjacent the sprocket wheel 13 which fit into a square socket 15 on each end of the hub of the sprocket wheel 13 which causes them to revolve with the sprocket-wheel 13. A collar 16 is rigidly secured to the shaft 10 on the outside of the paddle wheels to hold them in their proper position on the shaft 10. A sprocket chain 17 connects the sprocket wheels 8 and 13 so that when the pedals 9 are operated the paddles will be turned causing the floats to move forward or backward as desired. Revolubly mounted in the upright 3 is a shaft 18 having a rudder 19 rigidly secured to its lower end and handle bars 20 secured to its upper end by means of which the rudder 19 is operated to steer the boat.

Having thus described my invention what I claim is:

A bicycle boat comprising two floats, a frame connecting said two floats, a sprocket-wheel mounted in said frame, pedals secured to said sprocket-wheel, a shaft connecting said two floats near the front end thereof, a sprocket-wheel revolubly mounted on said shaft and having square sockets in opposite ends thereof, two paddle wheels revolubly mounted on said shaft each having a square boss on one end to fit into the square socket of the sprocket-wheel hub, collars rigidly secured to said shaft adjacent the paddle wheels to hold them securely to the sprocket-wheel, and means mounted in said frame for guiding the boat.

ELWOOD R. PERRY.